(12) United States Patent
Palamara et al.

(10) Patent No.: US 11,696,227 B2
(45) Date of Patent: Jul. 4, 2023

(54) APN FOR CONNECTING TO A VIRTUAL HOME NETWORK

(71) Applicant: Verizon Patent and Licensing Inc., Basking Ridge, NJ (US)

(72) Inventors: Maria E. Palamara, Denville, NJ (US); Burhan Syed, Bridgewater, NJ (US); Kristen Sydney Young, Morris Plains, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/303,849

(22) Filed: Jun. 9, 2021

(65) Prior Publication Data
US 2021/0297943 A1    Sep. 23, 2021

Related U.S. Application Data

(63) Continuation of application No. 16/694,853, filed on Nov. 25, 2019, now Pat. No. 11,044,665.

(51) Int. Cl.
| | |
|---|---|
| *H04W 48/18* | (2009.01) |
| *H04W 12/06* | (2021.01) |
| *H04W 12/08* | (2021.01) |
| *H04W 88/06* | (2009.01) |
| *H04W 4/70* | (2018.01) |
| *H04W 36/14* | (2009.01) |
| *H04W 76/10* | (2018.01) |

(52) U.S. Cl.
CPC .......... *H04W 48/18* (2013.01); *H04W 4/70* (2018.02); *H04W 12/06* (2013.01); *H04W 12/08* (2013.01); *H04W 36/14* (2013.01); *H04W 76/10* (2018.02); *H04W 88/06* (2013.01)

(58) Field of Classification Search
CPC ..... H04W 48/18; H04W 88/06; H04W 12/06; H04W 4/70; H04W 12/08; H04W 36/14; H04W 76/10
See application file for complete search history.

(56) References Cited

U.S. PATENT DOCUMENTS

| | | | |
|---|---|---|---|
| 2013/0132854 A1* | 5/2013 | Raleigh | G06F 3/0482 715/738 |
| 2019/0079804 A1 | 3/2019 | Thyagarajan | |
| 2020/0008044 A1 | 1/2020 | Poornachandran et al. | |

\* cited by examiner

*Primary Examiner* — Diane D Mizrahi

(57) ABSTRACT

A device associated with a home network may receive an access point name (APN) request from a device associated with a visitor network, wherein the APN request is associated with a user device. The device associated with the home network may cause, based on the APN request, a virtual home network to be instantiated that includes a virtual gateway, wherein the virtual home network is physically closer to the user device than the home network. The device associated with the home network may generate an APN that identifies the virtual home network and the virtual gateway. The device associated with the home network may cause the APN to be sent to the device associated with the visitor network to cause a gateway associated with the visitor network to connect to the virtual gateway.

20 Claims, 13 Drawing Sheets

APN FOR CONNECTING TO A VIRTUAL HOME NETWORK

RELATED APPLICATION

This application is a continuation of U.S. patent application Ser. No. 16/694,853, entitled "APN FOR CONNECTING TO A VIRTUAL HOME NETWORK," filed Nov. 25, 2019 (now U.S. Pat. No. 11,044,665), which is incorporated herein by reference in its entirety.

BACKGROUND

Roaming services enable user devices to use services associated with a home network when the user device is outside of the home network. Home-routed routing enables a user device to connect to a visitor network and access services provided by the home network through a gateway associated with the home network.

DETAILED DESCRIPTION OF PREFERRED EMBODIMENTS

Figure 1A:
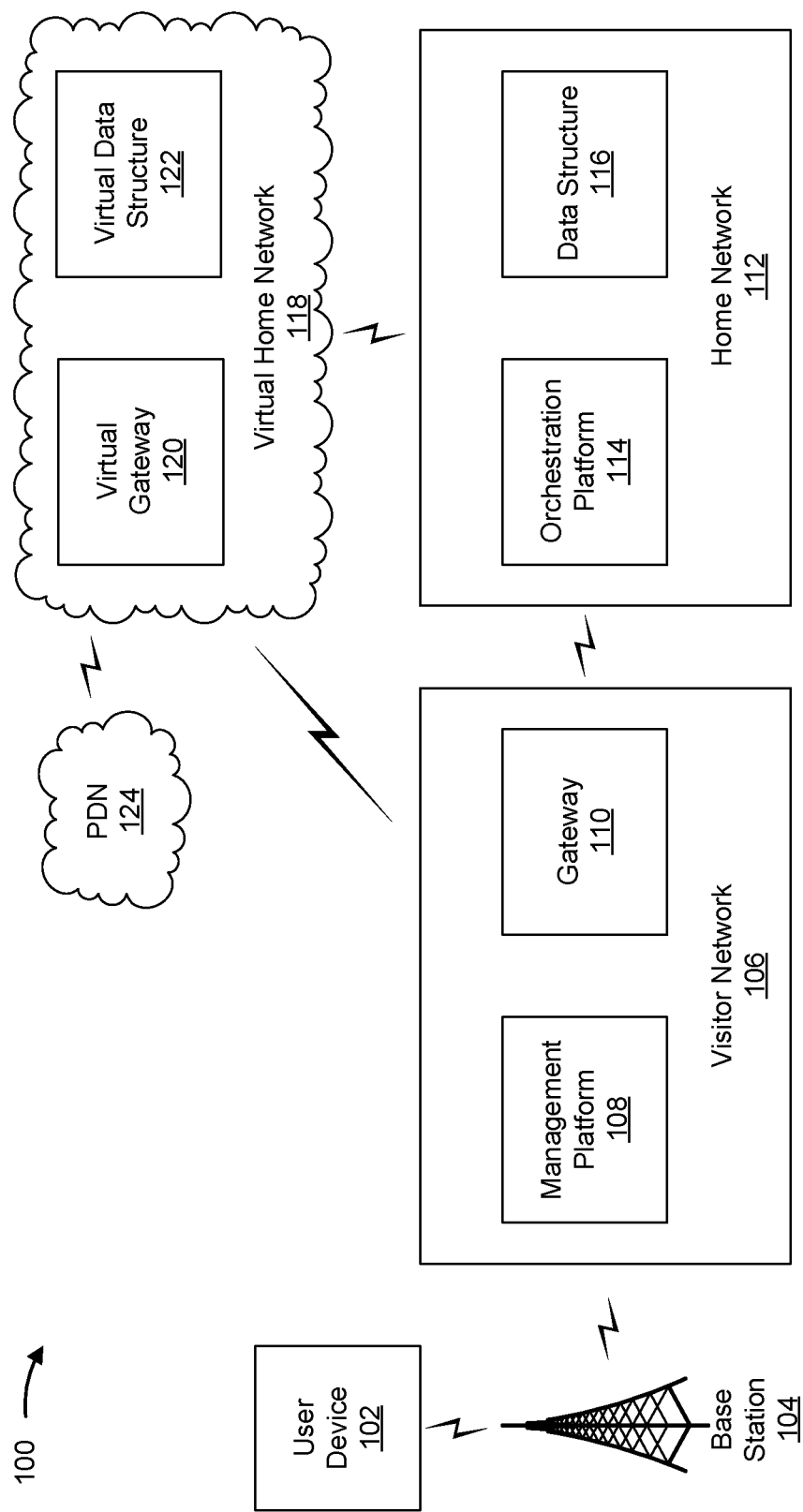
FIGS. 1A-1G are diagrams of one or more example implementations described herein.

The following detailed description of example implementations refers to the accompanying drawings. The same reference numbers in different drawings may identify the same or similar elements.

A user device may subscribe to a home network (e.g., an LTE wireless telecommunications network, a 5G wireless telecommunications network, and/or the like) for the home network to provide services (e.g., voice services, data services, messaging services, and/or the like) to the user device. In some instances, the user device may leave a geographic area covered by the home network (e.g., a user of the user device may travel with the user device to a country not associated with the home network). In many cases, the user device may connect to a visitor network to obtain at least some of the services provided by the home network (e.g., access a packet data network (PDN), such as the Internet). In some cases, the visitor network may employ home-routed routing, which forwards traffic generated by the user device from a gateway of the visitor network to a gateway of the home network. This allows the home network to monitor and/or filter the traffic (e.g., according to a subscription agreement between the user device and the home network) before delivering the traffic to a destination (e.g., the PDN). However, when the home network is physically far (e.g., greater than 100 hundred kilometers) from the user device and/or the visitor network, a noticeable latency may be present when communicating traffic back and forth between the user device and the destination (e.g., via the visitor network and the home network). Further, this may use resources (e.g., processing resources, memory resources, networking resources, power resources, and/or the like) of the home network to communicate the traffic back and forth between the user device and the destination.

According to some implementations described herein, a virtual home network may be instantiated to facilitate communicating traffic between a user device and a PDN. In some implementations, the user device may be connected to a visitor network and may send a request to access the PDN to a management platform of the visitor network. In some implementations, the management platform may generate and send an access point name (APN) request (an APN is also referred to as a data network name (DNN) when associated with a 5G wireless telecommunications network) concerning the PDN to an orchestration platform of the home network. In some implementations, the orchestration platform may cause the virtual home network to be instantiated with a virtual gateway connected to the PDN. In some implementations, the orchestration platform may generate and send an APN that identifies the virtual home network and/or the virtual gateway to the management platform, which may cause a connection between a gateway of the visitor network and the virtual gateway of the virtual home network. Accordingly, in some implementations, the user device may communicate traffic with the PDN via the visitor network and the virtual home network (e.g., instead of the home network)

In some implementations, the orchestration platform of the home network may cause the virtual home network to be instantiated on at least one device that is within a threshold distance of the user device and/or components of the visitor network. Accordingly, the virtual home network may be physically closer to the user device and/or the visitor network than the home network. In this way, traffic between the user device and PDN may travel a lesser distance when communicated via the virtual home network than when communicated via the home network, which can reduce traffic latency. Further, usage of resources of the home network may be reduced because the at least one device is hosting the virtual home network and facilitates forwarding of the traffic via the virtual gateway, rather than components of the home network.

FIGS. 1A-1G are diagrams of one or more example implementations 100 described herein. Example implementation(s) 100 illustrates various portions of one or more wireless telecommunications networks, such as one or more long term evolution (LTE) wireless telecommunications networks, one or more 5G wireless telecommunications networks, and/or the like.

As shown in FIG. 1A, example implementation(s) 100 may include a user device 102 wirelessly connected to a radio access network (RAN) at a base station 104, which is connected to visitor network 106. The visitor network 106 may be an LTE wireless telecommunications network, a 5G wireless telecommunications network, and/or the like. The visitor network 106 may include a management platform 108, a gateway 110, as well as other components and functions. In some implementations, the management platform 108 may be associated with, implemented by, and/or the like a mobility management entity (MME) or another component or function of an LTE wireless telecommunications network. Additionally, or alternatively, the management platform 108 may be associated with, implemented by, and/or the like an access and mobility management function (AMF), session management function (SMF), and/or another component or function of a 5G wireless telecommunications network. In some implementations, the gateway 110 may be associated with, implemented by, and/or the like a serving gateway (SGW) and/or another component or function of an LTE wireless telecommunications network. Additionally, or alternatively, the gateway 110 may be associated with, implemented by, and/or the like a user plane function (UPF) and/or another component or function of a 5G wireless telecommunications network.

The visitor network 106 may be configured to communicate with a home network 112. The home network 112 may be an LTE wireless telecommunications network, a 5G wireless telecommunications network, and/or the like. In some implementations, the home network 112 may be a home public land mobile network (HPLMN) for the user device 102 and the visitor network 106 may be a visitor public land mobile network (VPLMN). The home network 112 may include an orchestration platform 114, a data structure 116, as well as other components and functions. In some implementations, the orchestration platform 114 may be associated with, implemented by, and/or the like a policy and charging rules function (PCRF) and/or another component or function of an LTE wireless telecommunications network. Additionally, or alternatively, the orchestration platform 114 may be associated with, implemented by, and/or the like a policy control function (PCF), and/or another component or function of a 5G wireless telecommunications network. In some implementations, the data structure 116 may be associated with, implemented by, and/or the like a home subscriber server (HSS) and/or another component or function of an LTE wireless telecommunications network. Additionally, or alternatively, the data structure 116 may be associated with, implemented by, and/or the like an authentication server function (AUSF), a unified data management (UDM), and/or another component or function of a 5G wireless telecommunications network.

Figure 1B:
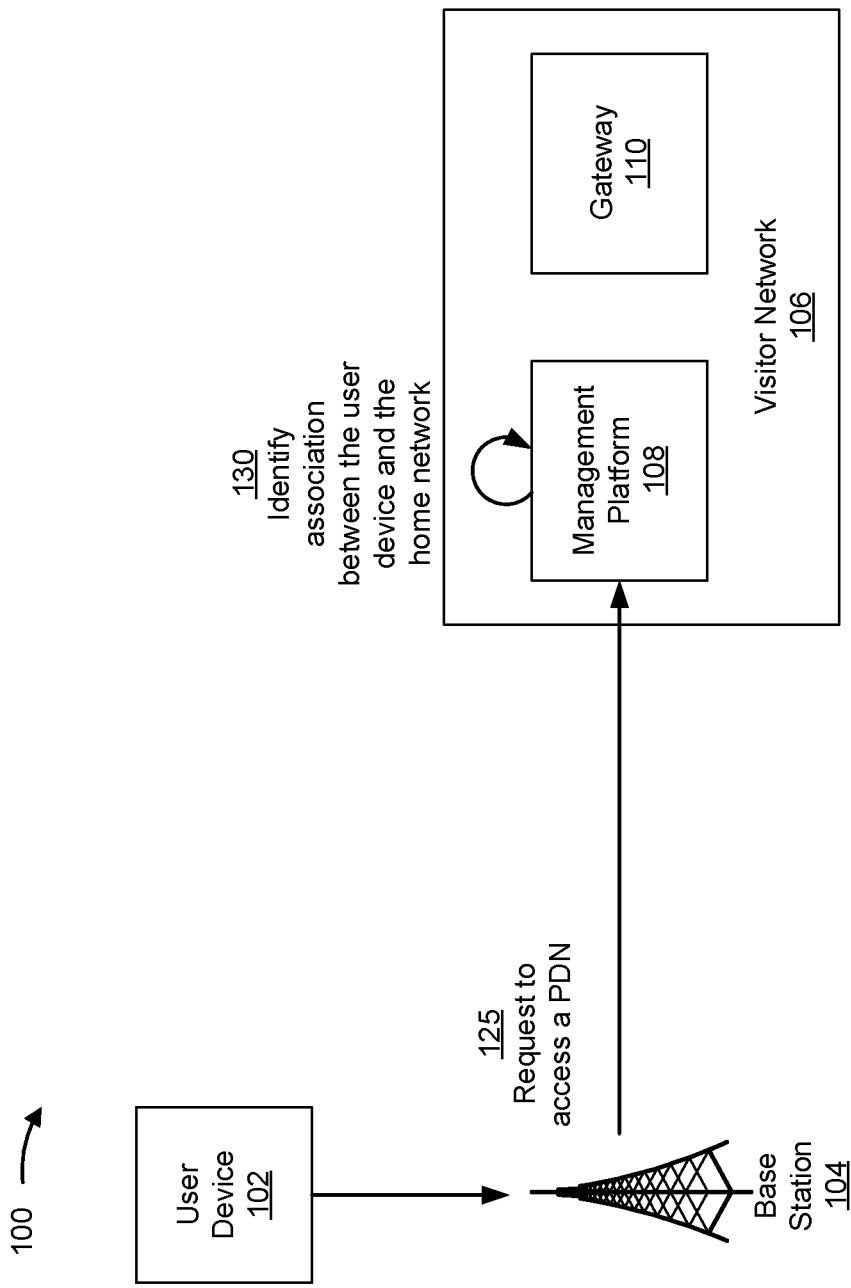
Figure 1C:
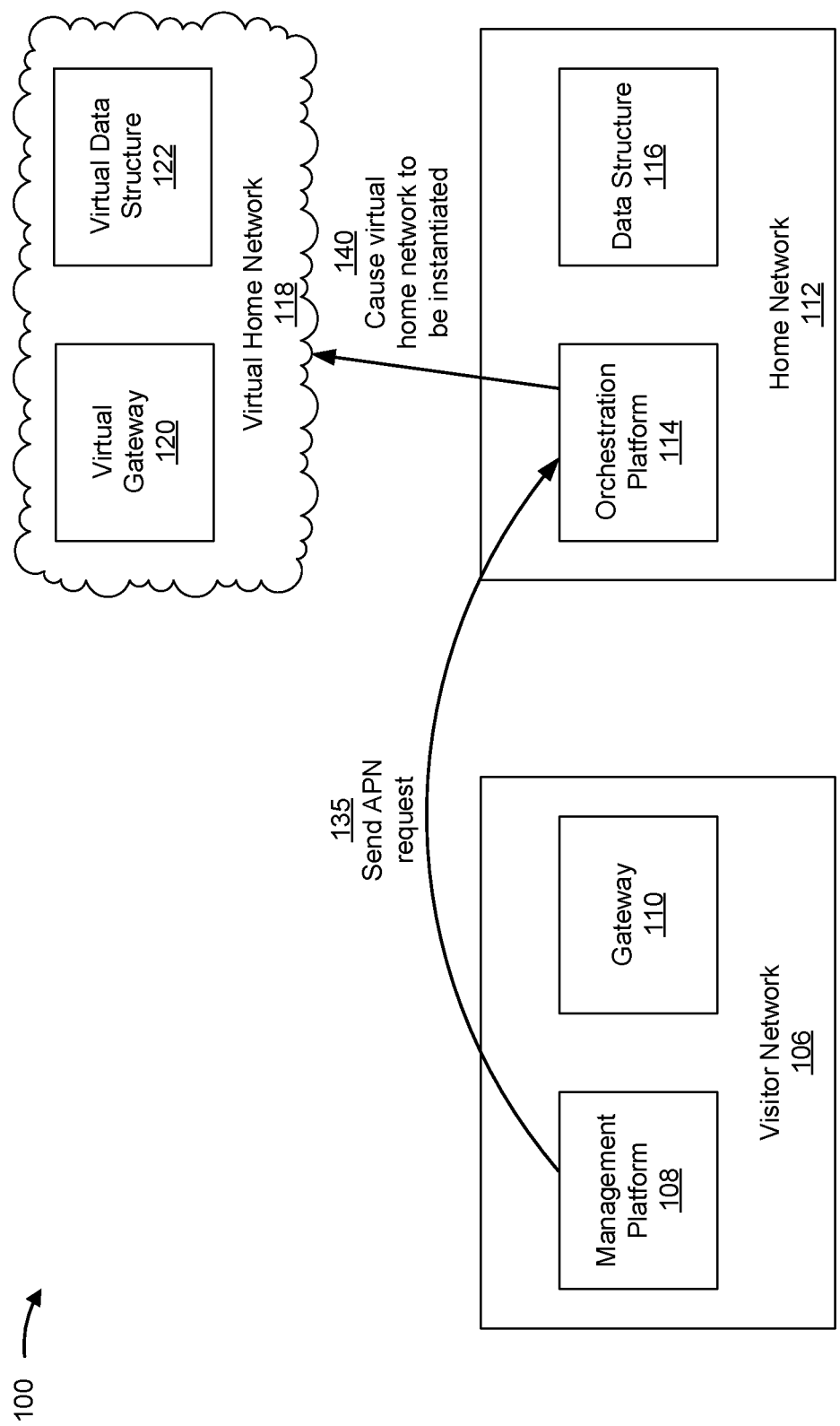

The orchestration platform 114 may be configured to cause virtual home network 118 to be instantiated (e.g., as described herein in relation to FIG. 1C and reference number 140). The virtual home network 118 may be configured to communicate with the visitor network 106 and/or the home network 112. The virtual home network 118 may be a virtual LTE wireless telecommunications network, a virtual 5G wireless telecommunications network, and/or the like. The virtual home network 118 may include a virtual gateway 120, a virtual data structure 122, as well as other components and functions. In some implementations, the virtual gateway 120 may be associated with, implemented by, and/or the like a virtual PGW and/or another component or function of an LTE wireless telecommunications network. Additionally, or alternatively, the virtual gateway 120 may be associated with, implemented by, and/or the like a virtual UPF and/or another component or function of a 5G wireless telecommunications network. The virtual gateway 120 may be configured to provide access to a packet data network (PDN) 124 (e.g., the Internet, a private PDN associated with the home network 112, and/or the like). In some implementations, virtual gateway 120 and/or virtual data structure 122 may be implemented in a cloud environment.

As shown in FIG. 1B and by reference number 125, the user device 102 may generate and send a request to access a PDN to the base station 104, which may send the request to access the PDN to the management platform 108 of the visitor network 106. The request to access the PDN may include information identifying the PDN (e.g., the Internet, a private PDN associated with the home network 112, and/or the like), information identifying the user device 102 (e.g., a unique identifier associated with the user device 102), information identifying a physical location of the user device 102 (e.g., GPS coordinates of the user device 102, a physical area associated with the user device 102, and/or the like), information concerning an association between the user device 102 and the home network 112 (e.g., information concerning a subscription of the user device 102 to the home network 112), and/or the like.

As shown by reference number 130, the management platform 108 may process (e.g., parse) the request to access the PDN to identify an association between the user device 102 and the home network 112. Accordingly, the management platform 108 may determine that the home network 112 is an HPLMN and the visitor network 106 is a VPLMN.

Moreover, to facilitate roaming of the user device 102, the management platform 108 may generate an APN request based on the request to access the PDN. For example, the management platform 108 may cause the APN request to include the information identifying the PDN, the information identifying the user device 102, the information identifying the physical location of the user device 102, the information concerning the association between the user device 102 and the home network 112, and/or the like included in the request to access the PDN. Additionally, or alternatively, the management platform 108 may cause the APN request to include information identifying a physical location of the management platform 108, a physical location of the gateway 110, and/or a physical location of any other component and/or function of the visitor network 106.

As shown in FIG. 1C and by reference number 135, the management platform 108 may send the APN request to the orchestration platform 114 of the home network 112. As shown by reference number 140, the orchestration platform 114 may process the APN request to cause the virtual home network 118 to be instantiated. For example, the orchestration platform 114 may process (e.g., parse) the APN request to determine and/or identify the physical location of the user device 102, the physical location of the management platform 108, the physical location of the gateway 110, and/or the physical location of any other component and/or function of the visitor network 106. The orchestration platform 114 may determine and/or identify (e.g., based on a table lookup, an algorithm, and/or the like) at least one device that is physically close. For example, the orchestration platform 114 may determine that a physical location of the at least one device is within (e.g., less than or equal to) a threshold distance (e.g., in feet, meters, miles, kilometers, and/or the like) to the user device 102, the management platform 108, the gateway 110, and/or any other component and/or function of the visitor network 106. The orchestration platform 114 may send a virtual network instantiation request to the at least one device and the at least one device may process the virtual network instantiation request to instantiate the virtual home network 118, the virtual gateway 120, and/or the virtual data structure 122 on the MEC device. Accordingly, because the virtual home network 118 is hosted on the at least one device being physically close, the virtual home network 118 may be physically closer to the user device 102 and/or a component and/or function of the visitor network 106 than the home network 112.

In some implementations, the at least one device is a server device, a multi-access edge computing (MEC) device, and/or the like. The at least one device may host or be associated with a cloud environment, a MEC environment, and/or the like. In this way, the virtual home network 118 may be instantiated in a cloud environment (e.g., instantiated in an edge cloud or a far edge cloud) associated with the home network 112 and/or the visitor network 106; may be instantiated in a MEC environment associated with the home network 112 and/or the visitor network 106; and/or the like.

In some implementations, the virtual gateway 120 may connect to the PDN 124. For example, when the virtual home network 118 is an LTE wireless telecommunications network, the virtual gateway 120 may connect to the PDN 124 via an SGi connection. As another example, when the virtual home network 118 is a 5G wireless telecommunications network, the virtual gateway 120 may connect to the PDN 124 via an N6 connection.

Figure 1D:
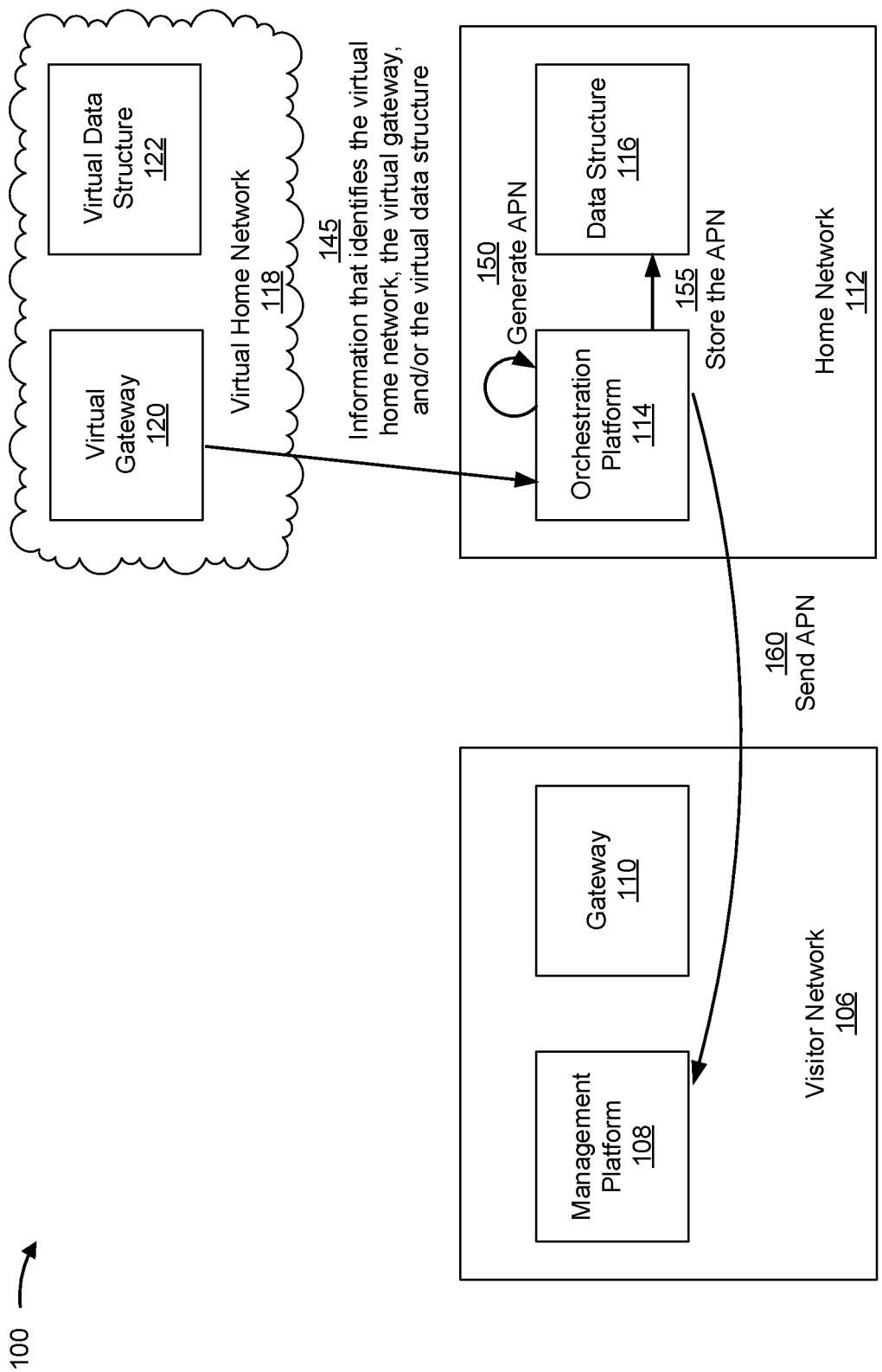

As shown in FIG. 1D and by reference number 145, the orchestration platform 114 may obtain information that identifies the virtual home network 118, the virtual gateway 120, the virtual data structure 122, and/or the like (e.g., address information of the virtual home network 118, the virtual gateway 120, the virtual data structure 122, and/or the like). For example, virtual gateway 120 may send (e.g., after being instantiated) information that identifies the virtual home network 118, the virtual gateway 120, the virtual data structure 122, and/or the like.

As shown by reference number 150, the orchestration platform 114 may generate an APN (e.g., based on the information that identifies the virtual home network 118, the virtual gateway 120, the virtual data structure 122, and/or the like). The APN may include information identifying the PDN 124, information identifying the virtual home network 118, information identifying the virtual gateway 120, information identifying the virtual data structure 122, and/or the like. As shown by reference number 155, the orchestration platform 114 may cause the data structure 116 to store the APN. For example, orchestration platform 114 may send the APN to the data structure 116 to cause the APN to be added to the data structure 116. As shown by reference number 160, the orchestration platform 114 may send the APN to the management platform 108. Additionally, or alternatively, the orchestration platform 114 may cause the data structure 116 to send the APN to the management platform 108 (e.g., by sending a command message to the data structure 116).

Figure 1E:
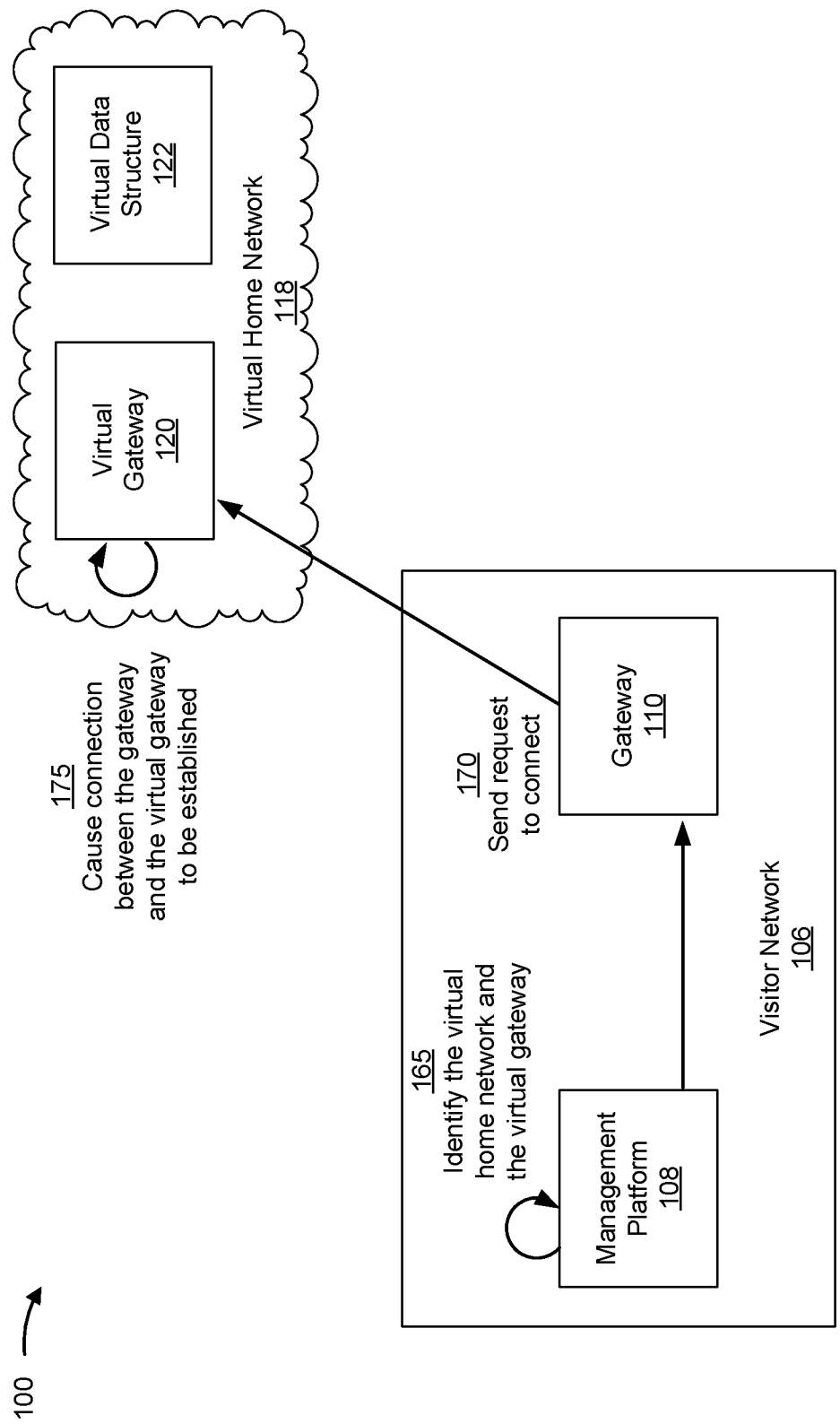

As shown in FIG. 1E, and by reference number 165, the management platform 108 may process (e.g., parse) the APN to identify the virtual home network 118 and/or the virtual gateway 120 (e.g., as providing access to the PDN 124). As shown by reference number 170, the management platform 108 may generate and send, to the gateway 110, a request to connect to the virtual home network 118 and/or the virtual gateway 120 (e.g., based on identifying the virtual home network 118 and/or the virtual gateway 120). The gateway 110 may send the request to connect to the virtual home network 118 and/or the virtual gateway 120 to the virtual gateway 120 of the virtual home network 118.

Figure 1F:
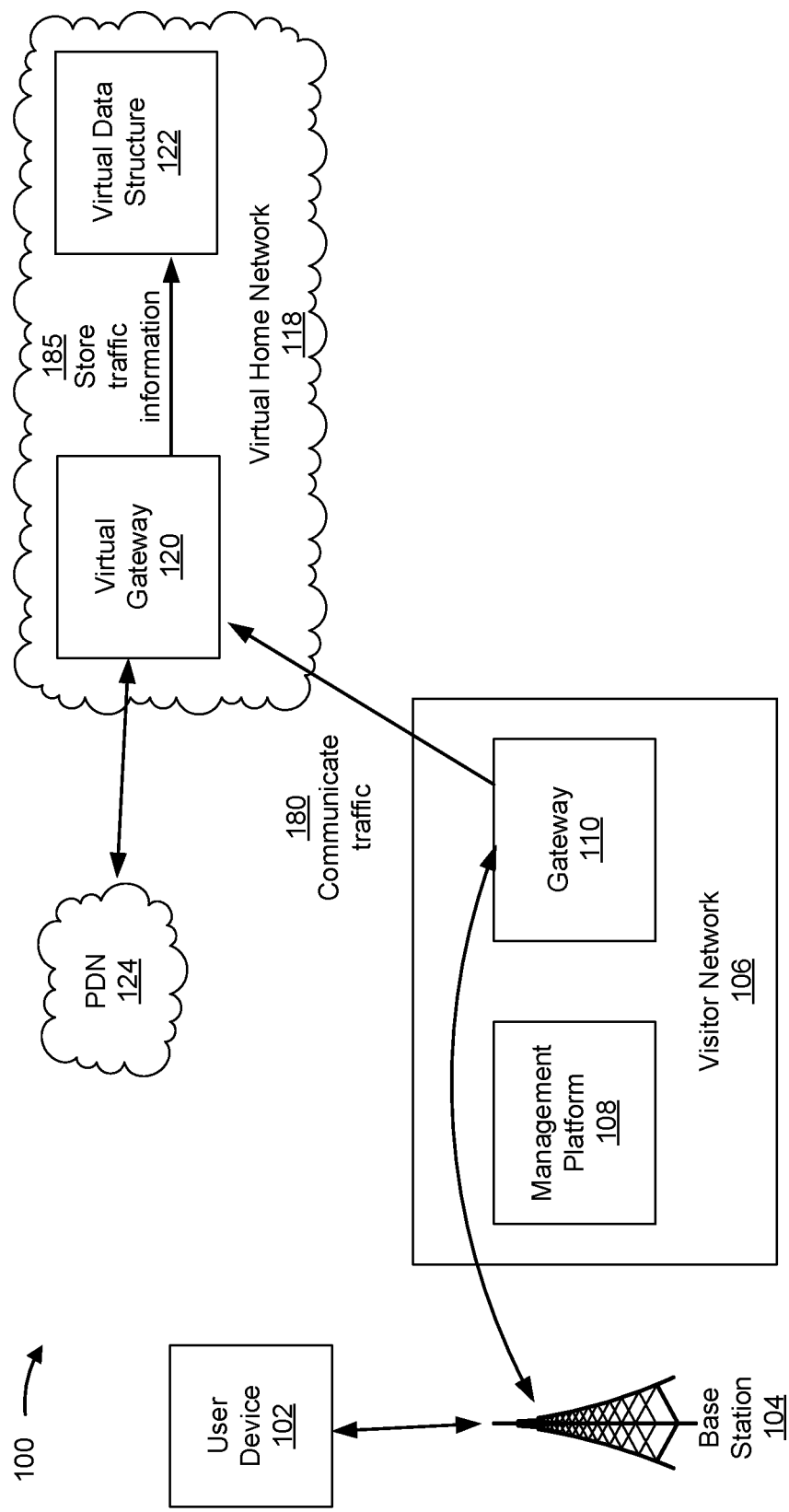

As shown by reference number 175, the virtual gateway 120 may cause, based on the request to connect to the virtual home network 118 and/or the virtual gateway 120, a connection between the gateway 110 and the virtual gateway 120 to be established. The connection may be a general packet radio services tunneling protocol (GTP) connection. For example, when the visitor network 106 and the virtual home network 118 are LTE wireless telecommunications networks, the connection between the gateway 110 and the virtual gateway 120 may be an S8 GTP connection. As another example, when the visitor network 106 and the virtual home network 118 are 5G wireless telecommunications networks, the connection between the gateway 110 and the virtual gateway 120 may be an N9 GTP connection As shown in FIG. 1F and by reference number 180, after the connection between the gateway 110 and the virtual gateway 120 is established, the user device 102 may be able to communicate traffic with the PDN 124 (e.g., via the base station 104, the gateway 110, and the virtual gateway 120).

In some implementations, the user device 102 may generate and send a request related to one or more applications (e.g., mapping applications, gaming applications, and/or the like executing on the user device 102) to the management platform 108. The request may indicate that information related to the one or more applications is to be deployed to facilitate a gateway communicating traffic between the user device 102 and the PDN 124. The management platform 108 may send, to the orchestration platform 114 of the home network 112, the request related to the one or more applications. The orchestration platform 114 may cause the information related to the one or more applications to be deployed to the virtual home network 118. For example, the orchestration platform 114 may send a command message to the data structure 116 to cause the data structure 116 to send the information related to the one or more applications (e.g., which may be saved in the data structure 116) to the virtual data structure 122 to cause the virtual data structure 122 to save the information related to the one or more applications. In this way, the information related to the one or more applications may be accessible to virtual gateway 120 and/or any other component or function of the virtual home network 118 to facilitate communicating traffic between the user device 102 and the PDN 124.

As shown by reference number 185, the virtual gateway 120 may collect information concerning the traffic and may cause the virtual data structure 122 to store the information concerning the traffic. The information concerning the traffic may include information concerning key performance indicators associated with traffic received and forwarded by the virtual gateway 120. The information may further concern reporting and analytics associated with the traffic received and forwarded by the virtual gateway 120, or in some aspects, the information is concerning errors or alerts associated with the traffic received and forwarded by the virtual gateway 120. Furthermore, the information may concern a performance of the virtual gateway 120, and/or any combination of the above, or the like. In some implementations, the virtual gateway 120 may send the information concerning the traffic to the virtual data structure 122 to cause the information concerning the traffic to be added to the virtual data structure 122.

Figure 1G:
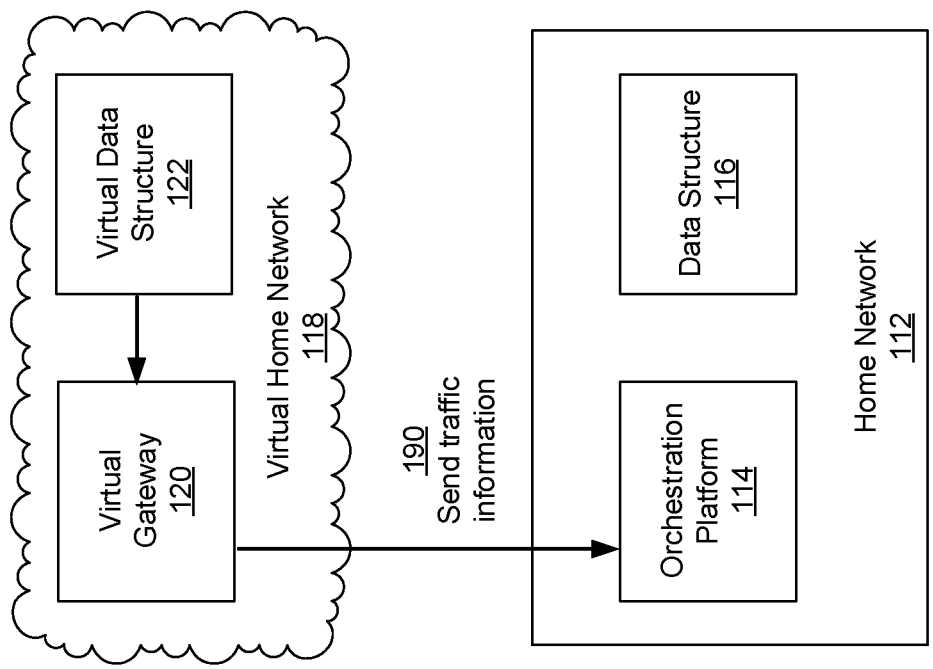

As shown in FIG. 1G and by reference number 190, the virtual gateway 120 may obtain the information concerning the traffic from the virtual data structure 122 and may send the information concerning the traffic to the orchestration platform 114. The orchestration platform 114 may send the information concerning the traffic to one or more other functions and/or components of the home network 112 (e.g., to determine a quality of service (QoS) associated with the traffic and/or the virtual gateway 120).

As indicated above, FIGS. 1A-1G are provided merely as an example. Other examples can differ from what was described with regards to FIGS. 1A-1G.

Figure 2A:
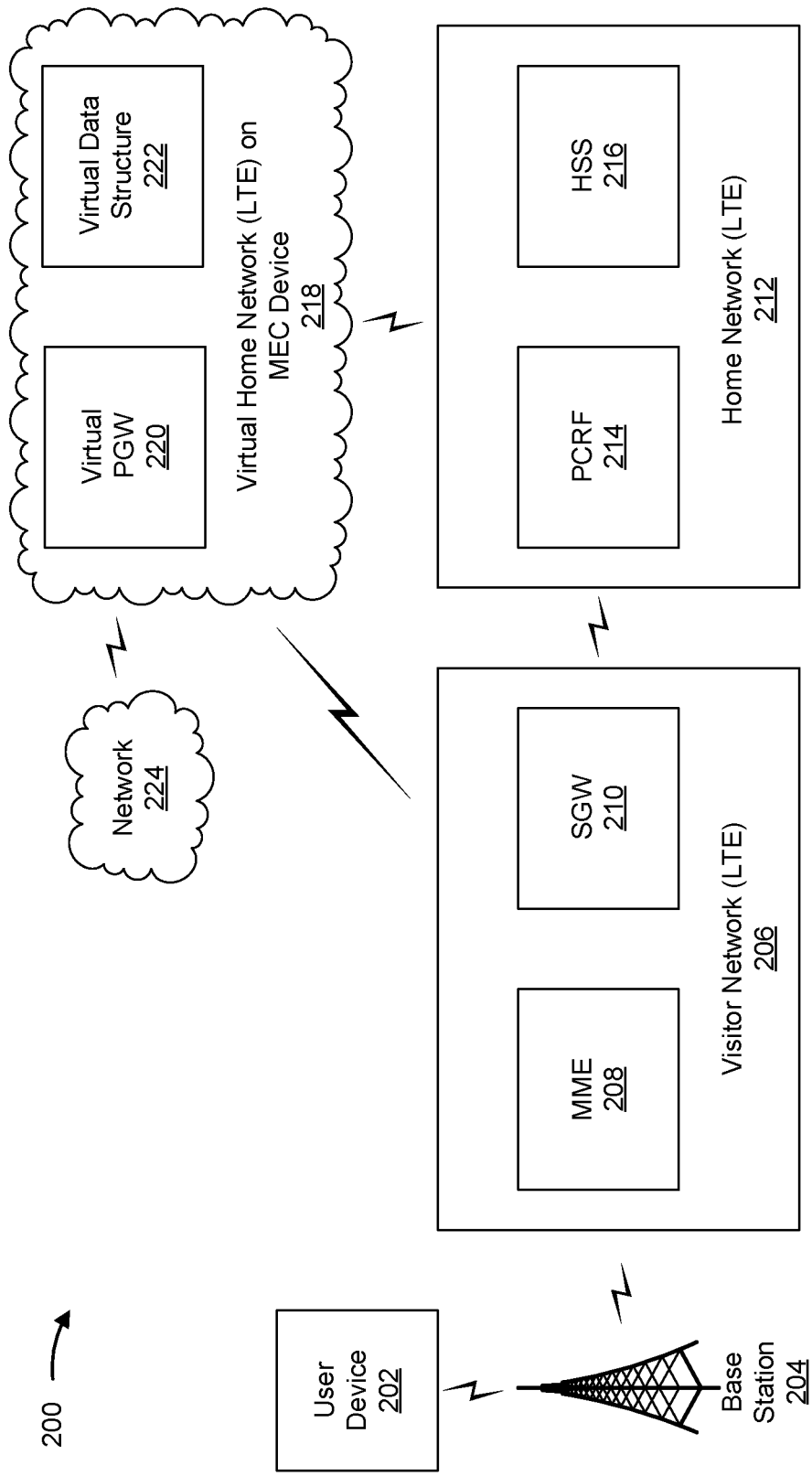
FIGS. 2A-2B are diagrams of example environments in which systems and/or methods described herein may be implemented.
Figure 2B:
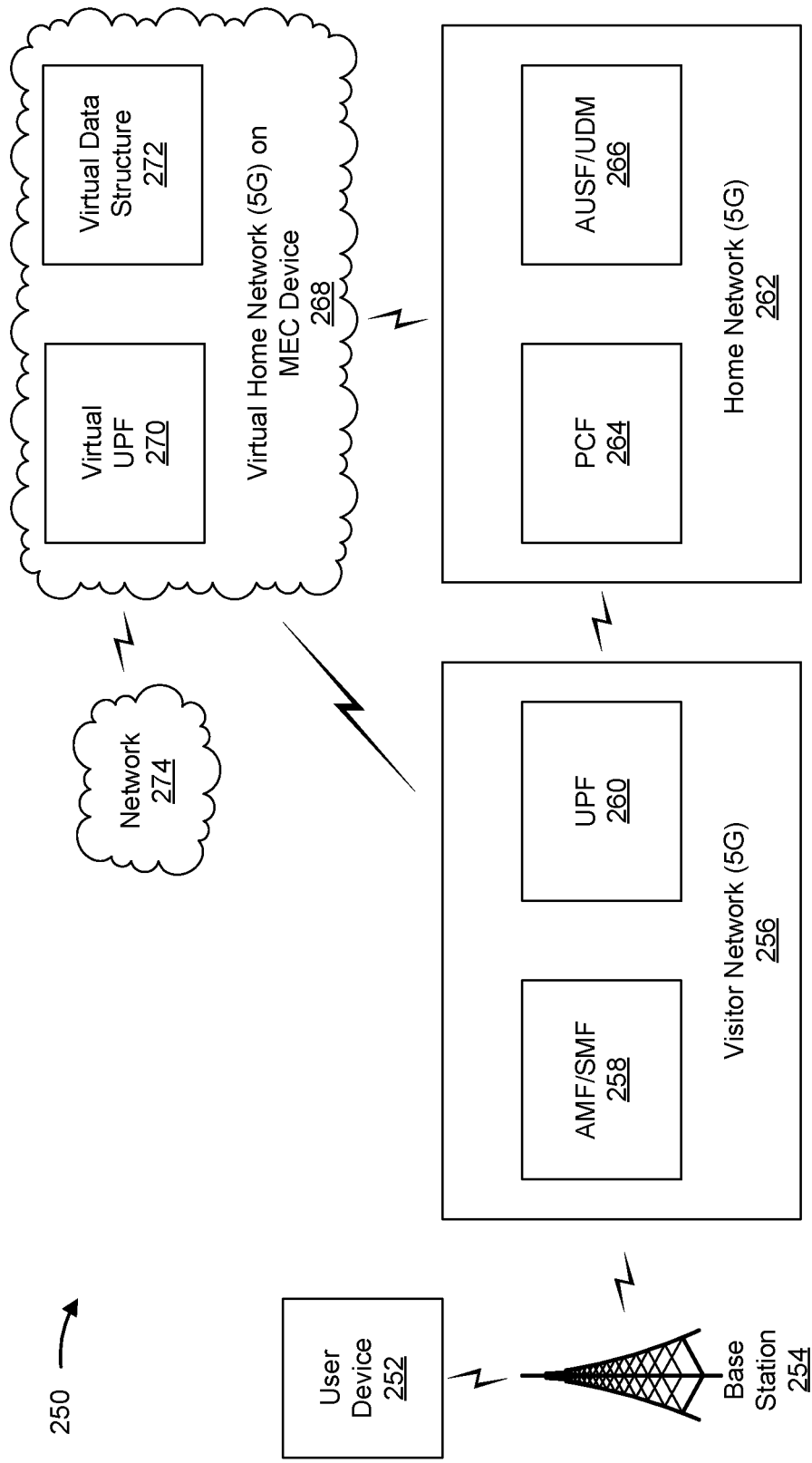

FIGS. 2A-2B are diagrams of example environments in which systems and/or methods, described herein, may be implemented. FIG. 2A shows an example environment 200 where a visitor network 206, a home network 212, and/or a virtual home network (e.g., hosted on MEC device 218) are LTE networks. FIG. 2B shows an example environment 250 where a visitor network 256, a home network 262, and/or a virtual home network (e.g., hosted on MEC device 268) are 5G networks.

As shown in FIG. 2A, environment 200 may include a user device 202, a base station 204, a visitor network 206, an MME 208, an SGW 210, a home network 212, a PCRF 214, an HSS 216, MEC device 218 (e.g., that hosts a virtual home network), a virtual PGW 220, a virtual data structure 222, and/or a network 224. MME 208 and/or SGW 210 may be included in visitor network 206. PCRF 214 and/or HSS 216 may be included in home network 212. Virtual PGW 220 and/or Virtual data structure 222 may be included in a virtual home network hosted by MEC device 218. Devices of environment 200 may interconnect via wired connections, wireless connections, or a combination of wired and wireless connections.

User device 202 includes one or more devices capable of receiving, generating, storing, processing, and/or providing information, such as information described herein. For example, user device 202 may include a communication and/or computing device, such as an Internet of Things (IoT) device (e.g., a category M1 (Cat-M1) device, a narrow band (NB) IoT device, and/or the like) a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 202 may correspond to user device 102 described herein.

Base station 204 includes one or more devices capable of transferring traffic, such as audio, video, text, one or more messages, and/or other traffic, to or from user device 202, MME 208, and/or SGW 210. In some implementations, base station 204 can include a small cell base station, such as a base station of a microcell, a picocell, and/or a femtocell. In some implementations, base station 204 can send traffic to and/or receive traffic from user device 202, MME 208, and/or SGW 210 via an air interface. In some implementations, base station 204 may include an eNB associated with an LTE network, a gNB associated with a 4G non-standalone (NSA) network, and/or the like.

Visitor network 206 can include one or more wired and/or wireless networks, such as an LTE network. MME 208 includes one or more network devices, such as one or more server devices, capable of managing authentication, activation, deactivation, and/or mobility functions associated with user device 202. In some implementations, MME 208 may implement the management platform 108 and/or perform some or all of the operations performed by the management platform 108 as described herein.

SGW 210 can include one or more devices capable of routing traffic to and/or from the visitor network 206. For example, SGW 210 can include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 210 can aggregate traffic received from base station 204 and can send the aggregated traffic to network 224 (e.g., via virtual PGW 220). SGW 210 can also receive traffic from network 224 (e.g., via virtual PGW 220), and can send the received traffic to user device 202 via base station 204. In some implementations, SGW 210 may implement the gateway 110 and/or perform some or all of the operations performed by the gateway 110 as described herein.

Home network 212 can include one or more wired and/or wireless networks, such as an LTE network. PCRF 214 includes one or more network devices, such as one or more server devices, capable of managing authentication, activation, deactivation, and/or mobility functions associated with user device 202. In some implementations, PCRF 214 may implement the orchestration platform 114 and/or perform some or all of the operations performed by the orchestration platform 114 as described herein.

HSS 216 can include one or more devices, such as one or more server devices, capable of managing (e.g., receiving, generating, storing, processing, and/or providing) information associated with user device 202. For example, HSS 216 can manage subscription information associated with user device 202, such as information that identifies a subscriber profile of a user associated with user device 202, information that identifies services and/or applications that are accessible to user device 202, location information associated with user device 202, a network identifier (e.g., a network address) that identifies user device 202, information that identifies a treatment of user device 202 (e.g., quality of service information, a quantity of minutes allowed per time period, a quantity of data consumption allowed per time period, etc.), and/or similar information. In some implementations, HSS 216 can generate, determine, and/or maintain a list of APNs associated with the user device 202. In some implementations, HSS 216 may implement the data structure 116 and/or perform some or all of the operations performed by the data structure 116 as described herein.

MEC device 218 includes one or more devices capable of instantiating and/or hosting a virtual home network (e.g., a virtual LTE network). MEC device 218 may include a server device, a group of server devices, a desktop computer, a laptop computer, a multicast and broadcast function device (MCBC), and/or a similar type of device. In some implementations, MEC device 218 may be hosted within a MEC environment. Additionally, or alternatively, MEC device 218 may be hosted in a far edge cloud and/or an edge cloud of a cloud environment.

Virtual PGW 220 can be implemented on MEC device 218 to provide connectivity for user device 202 to a PDN, such as network 224. For example, virtual PGW 220 can virtualize one or more data processing and/or traffic transfer devices, such as a gateway, a router, a modem, a switch, a firewall, a NIC, a hub, a bridge, a server device, an OADM, or any other type of device that processes and/or transfers traffic. In some implementations, virtual PGW 220 can aggregate traffic received from SGW 210, and can send the aggregated traffic to network 224. Additionally, or alternatively, virtual PGW 220 can receive traffic from network 224, and can send the traffic to user device 202 via SGW 210 and base station 204. In some implementations, virtual PGW 220 may implement the virtual gateway 120 and/or perform some or all of the operations performed by the virtual gateway 120 as described herein.

Virtual data structure 222 can be implemented on MEC device 218 to manage (e.g., receive, generate, store, process, and/or provide) information associated with virtual PGW 220. Virtual data structure 222 may can virtualize one or more devices, such as one or more server devices, capable of storing and/or providing the information. In some implementations, virtual data structure 222 may implement the virtual data structure 122 and/or perform some or all of the operations performed by the virtual data structure 122 as described herein.

Network 224 can include one or more wired and/or wireless networks. For example, network 245 can include a PDN, a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

As shown in FIG. 2B, environment 250 may include a user device 252, a base station 254, a visitor network 256, an AMF/SMF 258, a UPF 260, a home network 262, a PCF 264, an AUSF/UDM 266, a MEC device 268 (e.g., that hosts a virtual home network), a virtual UPF 270, a virtual data structure 272, and/or a network 274. AMF/SMF 258 and/or UPF 260 may be included in visitor network 256. PCF 264 and/or AUSF/UDM 266 may be included in home network 262. Virtual UPF 270 and/or virtual data structure 272 may be included in a virtual home network hosted by MEC device 268. Devices of environment 200 may interconnect via wired connections, wireless connections, or a combination of wired and wireless connections.

User device 252 includes one or more devices capable of receiving, generating, storing, processing, and/or providing information, such as information described herein. For example, user device 252 may include a communication and/or computing device, such as an Internet of Things (IoT) device (e.g., a category M1 (Cat-M1) device, a narrow band (NB) IoT device, and/or the like) a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 252 may correspond to user device 102 described herein.

Base station 254 includes one or more devices capable of transferring traffic, such as audio, video, text, one or more messages, and/or other traffic, to or from user device 252, AMF/SMF 258, and/or UPF 260. In some implementations, base station 254 can include a small cell base station, such as a base station of a microcell, a picocell, and/or a femtocell. In some implementations, base station 254 can send traffic to and/or receive traffic from user device 252, AMF/SMF 258, and/or UPF 260 via an air interface. In some implementations, base station 254 may include a gNB associated with a 5G network.

Visitor network 256 can include one or more wired and/or wireless networks, such as a 5G network. AMF/SMF 258 includes one or more network devices, such as one or more server devices, capable of managing mobility functions and/or supporting the establishment, modification, and release of communications sessions. In some implementations, AMF/SMF 258 may implement the management platform 108 and/or perform some or all of the operations performed by the management platform 108 as described herein.

UPF 260 can include one or more devices capable of routing traffic to and/or from the visitor network 256. For example, UPF 260 can include one or more data processing and/or traffic transfer devices, such as a gateway, a router, a modem, a switch, a firewall, a MC, a hub, a bridge, a server device, an OADM, or any other type of device that processes and/or transfers traffic. In some implementations, UPF 260 can aggregate traffic received from base station 254 and can send the aggregated traffic to network 274 (e.g., via virtual UPF 270). UPF 260 can also receive traffic from network 274 (e.g., via virtual UPF 270), and can send the received traffic to user device 252 via base station 254. In some implementations, UPF 260 may implement the gateway 110 and/or perform some or all of the operations performed by the gateway 110 as described herein.

Home network 262 can include one or more wired and/or wireless networks, such as a 5G network. PCF 264 includes one or more network devices, such as one or more server devices, capable of managing mobility functions and/or supporting the establishment, modification, and release of communication sessions. In some implementations, PCF 264 may implement the orchestration platform 114 and/or perform some or all of the operations performed by the orchestration platform 114 as described herein.

AUSF/UDM 266 can include one or more devices, such as one or more server devices, capable of managing (e.g., receiving, generating, storing, processing, and/or providing) information associated with user device 252. In some implementations, AUSF/UDM 266 can generate, determine, and/or maintain a list of APNs (also referred to as DNNs) associated with the user device 252. In some implementations, AUSF/UDM 266 may implement the data structure 116 and/or perform some or all of the operations performed by the data structure 116 as described herein.

MEC device 268 includes one or more devices capable of instantiating and/or hosting a virtual home network (e.g., a virtual 5G network). MEC device 268 may include a server device, a group of server devices, a desktop computer, a laptop computer, a multicast and broadcast function device (MCBC), and/or a similar type of device. In some implementations, MEC device 268 may be hosted within a MEC environment. Additionally, or alternatively, MEC device 268 may be hosted in a far edge cloud and/or an edge cloud of a cloud environment.

Virtual UPF 270 can be implemented on MEC device 268 to provide connectivity for user device 252 to a PDN, such as network 274. For example, virtual UPF 270 can virtualize one or more data processing and/or traffic transfer devices, such as a gateway, a router, a modem, a switch, a firewall, a NIC, a hub, a bridge, a server device, an OADM, or any other type of device that processes and/or transfers traffic. In some implementations, virtual UPF 270 can aggregate traffic received from UPF 260, and can send the aggregated traffic to network 274. Additionally, or alternatively, virtual UPF 270 can receive traffic from network 274, and can send the traffic to user device 252 via UPF 260 and base station 254. In some implementations, virtual UPF 270 may implement the virtual gateway 120 and/or perform some or all of the operations performed by the virtual gateway 120 as described herein.

Virtual data structure 272 can be implemented on MEC device 268 to manage (e.g., receive, generate, store, process, and/or provide) information associated with virtual UPF 270. Virtual data structure 272 may can virtualize one or more devices, such as one or more server devices, capable of storing and/or providing the information. In some implementations, virtual data structure 222 may implement the virtual data structure 122 and/or perform some or all of the operations performed by the virtual data structure 122 as described herein.

Network 224 can include one or more wired and/or wireless networks. For example, network 245 can include a PDN, a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIGS. 2A-2B are provided as one or more examples. In practice, there may be additional devices and/or networks, fewer devices and/or networks, different devices and/or networks, or differently arranged devices and/or networks than those shown in FIGS. 2A-2B. Furthermore, two or more devices shown in FIGS. 2A-2B may be implemented within a single device, or a single device shown in FIGS. 2A-2B may be implemented as multiple, distributed devices. Additionally, or alternatively, a set of devices (e.g., one or more devices) of environment 200 may perform one or more functions described as being performed by another set of devices of environment 200.

Figure 3:
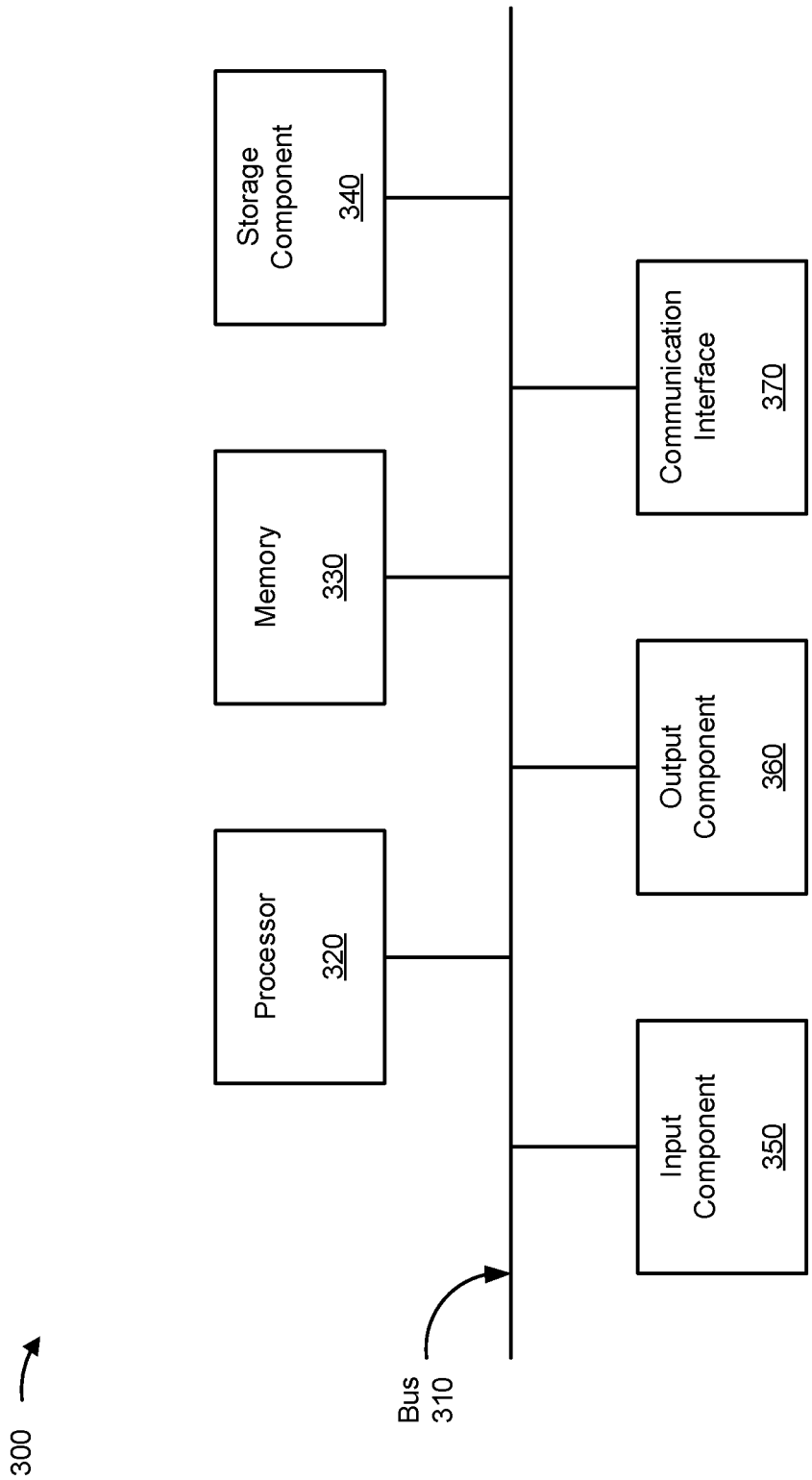
FIG. 3 is a diagram of example components of one or more devices of FIGS. 2A and 2B.

FIG. 3 is a diagram of example components of a device 300. Device 300 may correspond user device 202, base station 204, MME 208, SGW 210, PCRF 214, HSS 216, MEC device 218, user device 252, base station 254, AMF/SMF 258, UPF 260, PCF 264, AUSF/UDM 266, and/or MEC device 268. In some implementations, user device 202, base station 204, MME 208, SGW 210, PCRF 214, HSS 216, MEC device 218, user device 252, base station 254, AMF/SMF 258, UPF 260, PCF 264, AUSF/UDM 266, and/or MEC device 268 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
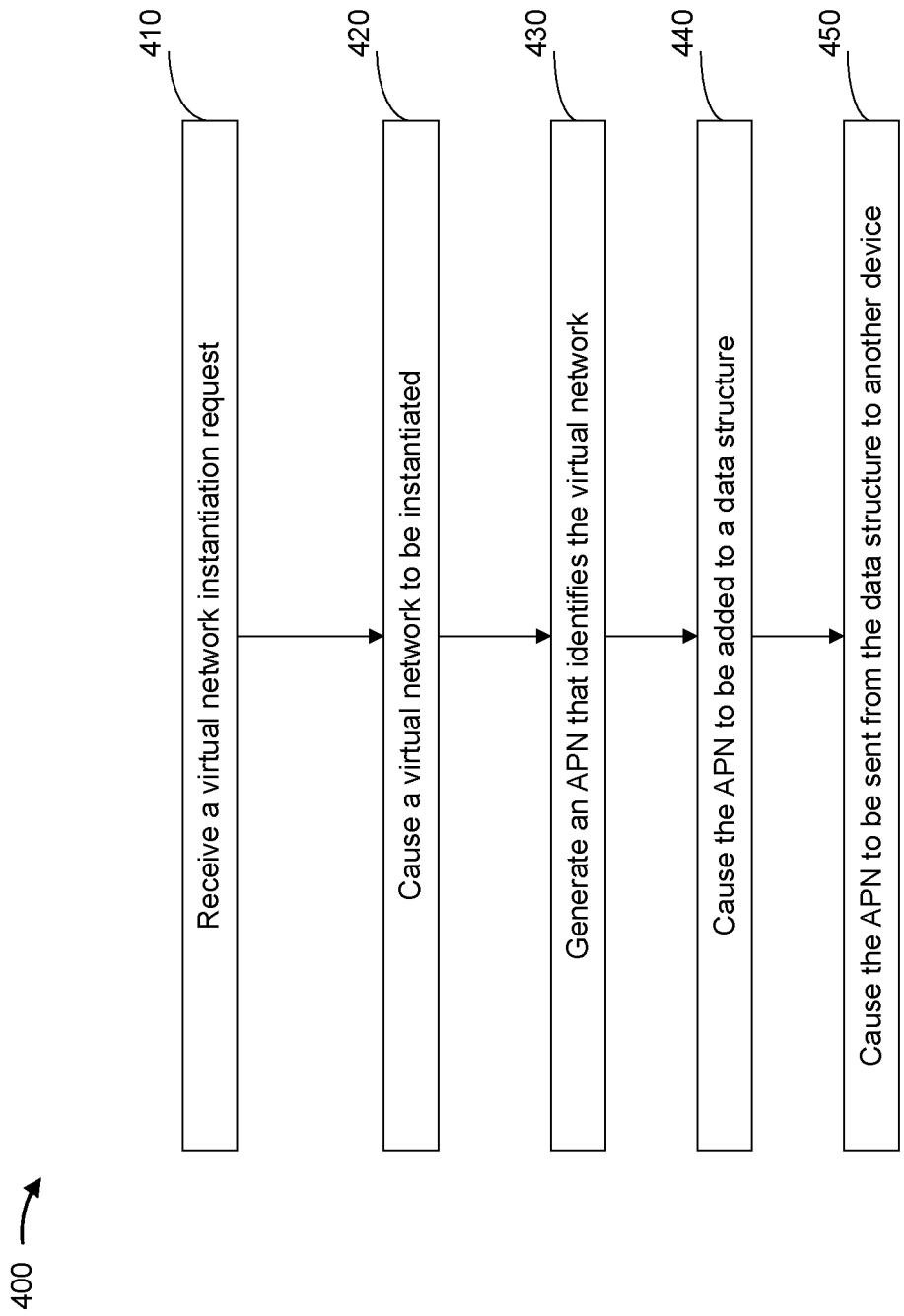
FIGS. 4-6 are flowcharts of example processes for using an APN to connect to a virtual home network.

FIG. 4 is a flow chart of an example process 400 for using an APN to connect to a virtual home network. In some implementations, one or more process blocks of FIG. 4 may be performed by a device (e.g., orchestration platform 114, PCRF 214, PCF 264, and/or the like) associated with an HPLMN (e.g., home network 112, home network 212, home network 262, and/or the like). In some implementations, one or more process blocks of FIG. 4 may be performed by another device or a group of devices separate from or including the device, such as another device of the home network.

As shown in FIG. 4, process 400 may include receiving a virtual network instantiation request (block 410). For example, the device (e.g., using processor 320, memory 330, storage component 340, input component 350, output component 360, communication interface 370, and/or the like) may receive a virtual network instantiation request, as described above. The virtual network instantiation request may be an APN request (e.g., associated with a user device. The device may receive the virtual network instantiation request from an MME associated with a VPLMN.

As further shown in FIG. 4, process 400 may include causing a virtual network to be instantiated (block 420). For example, the device (e.g., using processor 320, memory 330, storage component 340, input component 350, output component 360, communication interface 370, and/or the like) may cause, based on the virtual network instantiation request, a virtual network to be instantiated, as described above. The virtual network may be a virtual HPLMN that includes a virtual PGW. In some implementations, the virtual HPLMN is physically closer to the user device than the HPLMN.

As further shown in FIG. 4, process 400 may include generating an APN that identifies the virtual network (block 430). For example, the device (e.g., using processor 320, memory 330, storage component 340, input component 350, output component 360, communication interface 370, and/or the like) may generate an APN that identifies the virtual network, as described above. The APN may identify the virtual HPLMN and the virtual PGW.

As further shown in FIG. 4, process 400 may include causing the APN to be added to a data structure. For example, the device (e.g., using processor 320, memory 330, storage component 340, input component 350, output component 360, communication interface 370, and/or the like) may cause the APN to be added to a data structure, as described above. In some implementations, the APN may be added to an HSS associated with the HPLMN.

As further shown in FIG. 4, process 400 may include causing the APN to be sent from the data structure to another device (block 450). For example, the device (e.g., using processor 320, memory 330, storage component 340, input component 350, output component 360, communication interface 370, and/or the like) may cause the APN to be sent from the data structure to another device, as described above. In some implementations, the device may cause the APN to be sent from the HSS associated with the HPLMN to the MME associated with the VPLMN.

Process 400 may include additional implementations, such as any single implementation or any combination of implementations described below and/or in connection with one or more other processes described elsewhere herein.

In a first implementation, causing the APN to be sent from the HSS associated with the HPLMN to the MME associated with the VPLMN causes a serving gateway associated with the VPLMN to establish a connection with the virtual PGW.

In a second implementation, alone or in combination with the first implementation, the APN request includes information identifying a PDN, the virtual PGW is configured to provide access to the PDN.

In a third implementation, alone or in combination with one or more of the first and second implementations, the APN request includes information concerning a physical location of the MME associated with the VPLMN. Moreover, causing the virtual HPLMN to be instantiated comprises: identifying, based on the APN request, the physical location of the MME associated with the VPLMN; identifying, based on the physical location of the MME associated with the VPLMN, at least one server device within a threshold distance of the physical location of the MME associated with the VPLMN, and causing the at least one server device to instantiate the virtual HPLMN on the at least one server device.

In a fourth implementation, alone or in combination with one or more of the first through third implementations, the APN facilitates access to the Internet.

In a fifth implementation, alone or in combination with one or more of the first through fourth implementations, the virtual HPLMN is instantiated in a MEC environment.

In a sixth implementation, alone or in combination with one or more of the first through fifth implementations, the virtual HPLMN is hosted by a MEC device and a physical location of the MEC device is within a threshold distance of a physical location of the MME associated with the VPLMN.

In a seventh implementation, alone or in combination with one or more of the first through sixth implementations, the virtual HPLMN is instantiated in an edge cloud or a far edge cloud of a cloud environment associated with the HPLMN.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
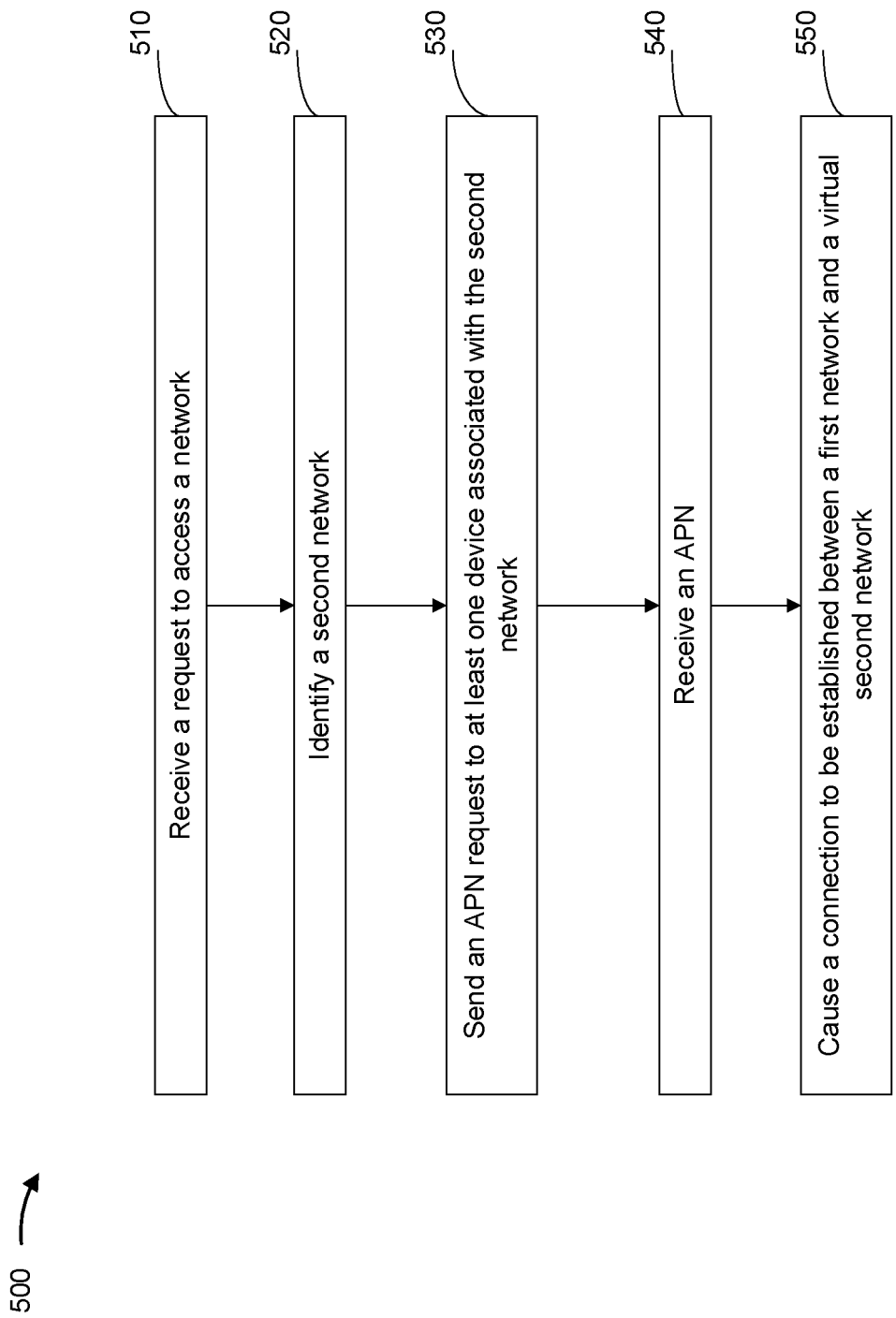

FIG. 5 is a flow chart of an example process 500 for using an APN to connect to a virtual home network. In some implementations, one or more process blocks of FIG. 5 may be performed by a device (e.g., management platform 108, MME 208, AMF/SMF 258, and/or the like) associated with a first network (e.g., visitor network 106, visitor network 206, visitor network 256, and/or the like). In some implementations, one or more process blocks of FIG. 5 may be performed by another device or a group of devices separate from or including the device, such as another device of the first network.

As shown in FIG. 5, process 500 may include receiving a request to access a network (block 510). For example, the device (e.g., using processor 320, memory 330, storage component 340, input component 350, output component 360, communication interface 370, and/or the like) may receive, from a user device via a base station, a request to access a PDN, as described above.

As further shown in FIG. 5, process 500 may include identifying a second network. For example, the device (e.g., using processor 320, memory 330, storage component 340, input component 350, output component 360, communication interface 370, and/or the like) may identify, based on the request to access the PDN, a second network associated with the user device.

As further shown in FIG. 5, process 500 may include sending an APN request to at least one device associated with the second network (block 530). For example, the device (e.g., using processor 320, memory 330, storage component 340, input component 350, output component 360, communication interface 370, and/or the like) may send an APN request to at least one device associated with the second network, as described above. In some implementations, sending the APN request causes the at least one device to instantiate a virtual second network that includes a virtual gateway. The virtual second network may be physically closer to the user device than the second network.

As further shown in FIG. 5, process 500 may include receiving an APN (block 540). For example, the device (e.g., using processor 320, memory 330, storage component 340, input component 350, output component 360, communication interface 370, and/or the like) may receive, from the at least one device associated with the second network, an APN, as described above.

As further shown in FIG. 5, process 500 may include causing a connection to be established between a first network and a virtual second network (block 550). For example, the device (e.g., using processor 320, memory 330, storage component 340, input component 350, output component 360, communication interface 370, and/or the like) may cause, based on the APN, a gateway associated with the first network to establish a connection with the virtual gateway of the second network, as described above.

Process 500 may include additional implementations, such as any single implementation or any combination of implementations described below and/or in connection with one or more other processes described elsewhere herein.

In a first implementation, the request to access the PDN includes at least one of: information identifying the PDN; information identifying the user device; information identifying a physical location of the user device; or information concerning an association between the user device and the second network.

In a second implementation, alone or in combination with the first implementation, the APN request includes at least one of: information identifying the PDN; information concerning a physical location of the device, a physical location of the gateway, or a physical location of the user device; or information concerning an association between the user device and the second network.

In a third implementation, alone or in combination with one or more of the first and second implementations, the APN includes at least one of: information identifying the PDN; information identifying the virtual second network; or information identifying the virtual gateway.

In a fourth implementation, alone or in combination with one or more of the first through third implementations, the connection between the gateway and the virtual gateway is an S8 general packet radio services tunneling protocol connection.

In a fifth implementation, alone or in combination with one or more of the first through fourth implementations, the connection between the gateway and the virtual gateway is an N9 general packet radio services tunneling protocol connection.

In a sixth implementation, alone or in combination with one or more of the first through fifth implementations, the virtual second network is hosted by at least one MEC device of a MEC environment and a physical location of the at least one MEC device is within a threshold distance of a physical location of the device, a physical location of the gateway, or a physical location of the user device.

In a seventh implementation, alone or in combination with one or more of the first through sixth implementations, process 500 includes receiving, from the user device via the base station, a request related to one or more applications and sending, based on the request related to the one or more applications, an application deployment request to the at least one device associated with the second network to cause the at least one device to deploy information related to the one or more applications to the virtual second network.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
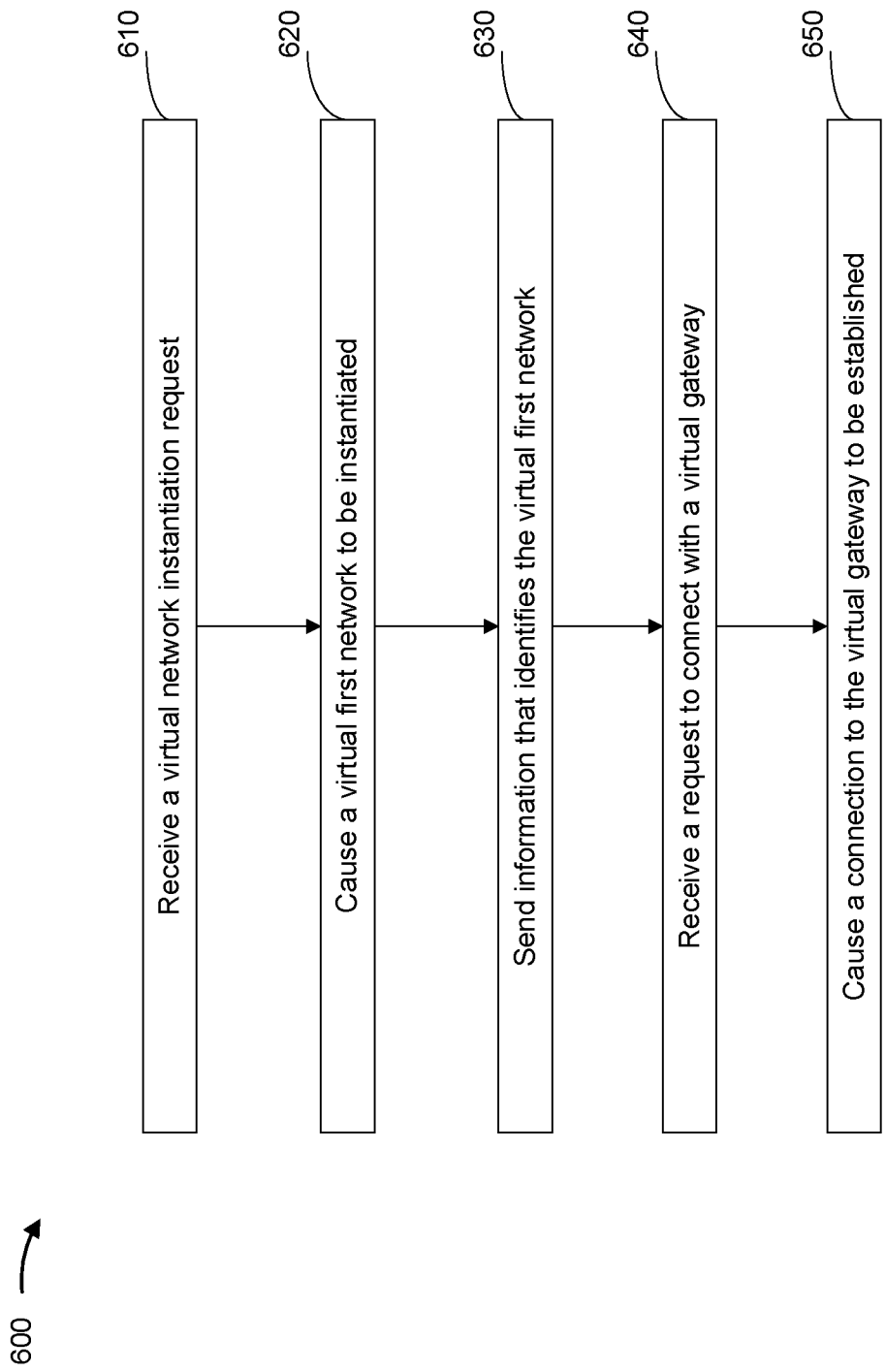

FIG. 6 is a flow chart of an example process 600 for using an APN to connect to a virtual home network. In some implementations, one or more process blocks of FIG. 6 may be performed by a MEC device (e.g., MEC device 218, MEC device 268, and/or the like). In some implementations, one or more process blocks of FIG. 6 may be performed by another device or a group of devices separate from or including the device, such as another MEC device, and/or the like.

As shown in FIG. 6, process 600 may include receiving a virtual network instantiation request (block 610). For example, the MEC device (e.g., using processor 320, memory 330, storage component 340, input component 350, output component 360, communication interface 370, and/or the like) may receive a virtual network instantiation request, as described above. The MEC device may receive the virtual network instantiation request from a device associated with a first network.

As further shown in FIG. 6, process 600 may include causing a virtual first network to be instantiated (block 620).

For example, the MEC device (e.g., using processor 320, memory 330, storage component 340, input component 350, output component 360, communication interface 370, and/or the like) may cause, based on the virtual network instantiation request, a virtual first network that includes a virtual gateway to be instantiated on the MEC device, as described above. In some implementations, the virtual first network is physically closer to a user device connected to a second network than the first network.

As further shown in FIG. 6, process 600 may include sending information that identifies the virtual first network (block 630). For example, the MEC device (e.g., using processor 320, memory 330, storage component 340, input component 350, output component 360, communication interface 370, and/or the like) may send, to the device associated with the first network, information that identifies the virtual first network and/or the virtual gateway, as described above.

As further shown in FIG. 6, process 600 may include receiving a request to connect with a virtual gateway (block 640). For example, the MEC device (e.g., using processor 320, memory 330, storage component 340, input component 350, output component 360, communication interface 370, and/or the like) may receive, from a gateway associated with a second network and after sending the information that identifies the virtual first network and the virtual gateway, a request to connect with the virtual gateway of the virtual first network, as described above.

As further shown in FIG. 6, process 600 may include causing a connection to the virtual gateway to be established (block 650). For example, the MEC device (e.g., using processor 320, memory 330, storage component 340, input component 350, output component 360, communication interface 370, and/or the like) may cause, based on the request to connect with the virtual gateway, a connection between the gateway and the virtual gateway to be established, as described above.

Process 600 may include additional implementations, such as any single implementation or any combination of implementations described below and/or in connection with one or more other processes described elsewhere herein.

In a first implementation, process 600 includes causing the virtual gateway to be connected to a packet data network via an SGi general packet radio services tunneling protocol connection.

In a second implementation, alone or in combination with the first implementation, process 600 includes causing a general packet radio services tunneling protocol connection to be established between the gateway and the virtual gateway.

In a third implementation, alone or in combination with one or more of the first and second implementations, process 600 includes sending, to at least one other device associated with the first network, at least one of: information is concerning key performance indicators associated with traffic received and forwarded by the virtual gateway; information is concerning reporting and analytics associated with the traffic received and forwarded by the virtual gateway; information is concerning errors or alerts associated with the traffic received and forwarded by the virtual gateway; or information is concerning a performance of the virtual gateway.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a first device associated with a first network, a virtual network instantiated request;
   causing, by the first device and based on the virtual network instantiated request, a virtual network to be instantiated;
   generating, by the first device, an access point name (APN) that identifies the virtual network;
   causing, by the first device, the APN to be added to a data structure associated with the first network; and
   causing, by the first device, the APN to be sent from the data structure to a second device associated with a second network.

2. The method of claim 1, wherein causing the APN to be sent from the data structure further comprises:
   causing the APN to be sent from a home subscriber server (HSS) associated with the first network,
      wherein the first network is a home public land mobile network (HPLMN).

3. The method of claim 1, wherein causing the APN to be sent from the data structure to the second device causes a serving gateway associated with the second network to establish a connection with a virtual packet data network gateway (PGW) associated with the virtual network.

4. The method of claim 3, wherein the virtual network instantiated request includes information identifying a packet data network (PDN),
   wherein the virtual PGW is configured to provide access to the PDN.

5. The method of claim 1, wherein the APN facilitates access to the Internet.

6. The method of claim 1, wherein the virtual network is instantiated in a multi-access edge computing (MEC) environment.

7. The method of claim 1, wherein the virtual network is instantiated in an edge cloud or a far edge cloud of a cloud environment associated with the first network.

8. A first device associated with a first network, comprising:
   one or more processors configured to:
      receive a virtual network instantiated request;
      cause, based on the virtual network instantiated request, a virtual network to be instantiated;
      generate an access point name (APN) that identifies the virtual network;
      cause the APN to be added to a data structure associated with the first network; and
      cause the APN to be sent from the data structure to a second device associated with a second network.

9. The first device of claim 8, wherein the one or more processors, to cause the APN to be sent from the data structure, are configured to:
   cause the APN to be sent from a home subscriber server (HSS) associated with the first network,
      wherein the first network is a home public land mobile network (HPLMN).

10. The first device of claim 8, wherein causing the APN to be sent from the data structure to the second device causes a serving gateway associated with the second network to establish a connection with a virtual packet data network gateway (PGW) associated with the virtual network.

11. The first device of claim 10, wherein the virtual network instantiated request includes information identifying a packet data network (PDN), and
wherein the virtual PGW is configured to provide access to the PDN.

12. The first device of claim 8, wherein the APN facilitates access to the Internet.

13. The first device of claim 8, wherein the virtual network is instantiated in a multi-access edge computing (MEC) environment.

14. The first device of claim 8, wherein the virtual network is instantiated in an edge cloud or a far edge cloud of a cloud environment associated with the first network.

15. A non-transitory computer-readable medium storing a set of instructions, the set of instructions comprising:
one or more instructions that, when executed by one or more processors of a first device associated with a first network, cause the first device to:
receive a virtual network instantiated request;
cause, based on the virtual network instantiated request, a virtual network to be instantiated;
generate an access point name (APN) that identifies the virtual network;
cause the APN to be added to a data structure associated with the first network; and
cause the APN to be sent from the data structure to a second device associated with a second network.

16. The non-transitory computer-readable medium of claim 15, wherein the one or more instructions, that cause the first device to cause the APN to be sent from the data structure, cause the first device to:
cause the APN to be sent from a home subscriber server (HSS) associated with the first network,
wherein the first network is a home public land mobile network (HPLMN).

17. The non-transitory computer-readable medium of claim 15, wherein causing the APN to be sent from the data structure to the second device causes a serving gateway associated with the second network to establish a connection with a virtual packet data network gateway (PGW) associated with the virtual network.

18. The non-transitory computer-readable medium of claim 17, wherein the virtual network instantiated request includes information identifying a packet data network (PDN), and
wherein the one or more instructions further cause the first device to provide access to the PDN.

19. The non-transitory computer-readable medium of claim 15, wherein the virtual network is instantiated in a multi-access edge computing (MEC) environment.

20. The non-transitory computer-readable medium of claim 15, wherein the virtual network is instantiated in an edge cloud or a far edge cloud of a cloud environment associated with the first network.

* * * * *